(12) United States Patent
Brinkmann et al.

(10) Patent No.: US 6,505,947 B1
(45) Date of Patent: Jan. 14, 2003

(54) DEVICE FOR CONTROLLING THE LIGHT DISTRIBUTION OF A HEADLAMP INSTALLATION OF A MOTOR VEHICLE

(75) Inventors: Dirk Brinkmann, Wiernsheim (DE); Stefan Eberhardt, Backnang (DE)

(73) Assignee: Dr. Ing. h.c.F. Porsche. AG, Weissach (DE)

( * ) Notice: Subject to any disclaimer, the term of this patent is extended or adjusted under 35 U.S.C. 154(b) by 0 days.

(21) Appl. No.: 09/692,327

(22) Filed: Oct. 20, 2000

(30) Foreign Application Priority Data

Oct. 20, 1999 (DE) .......................... 199 50 505

(51) Int. Cl.⁷ ................................. B60Q 1/24
(52) U.S. Cl. .................. 362/41; 362/465; 362/276
(58) Field of Search ................ 362/41, 464, 465, 362/277, 276, 526, 516; 118/48

(56) References Cited

U.S. PATENT DOCUMENTS

| 5,193,894 A | * | 3/1993 | Lietar et al. ............ 362/66 |
| 5,611,612 A | * | 3/1997 | Choji et al. ............ 362/267 |
| 5,941,633 A | * | 8/1999 | Saito et al. ............ 362/240 |
| 6,144,159 A | * | 11/2000 | Lopez et al. ............ 315/82 |
| 6,293,686 B1 | * | 9/2001 | Hayami et al. ........... 307/10.8 |

FOREIGN PATENT DOCUMENTS

| DE | 38 44 364 | 7/1966 |
| DE | 44 19 365 A1 | 7/1995 |
| DE | 44 19 365 | 7/1995 |
| DE | 3304403640 C2 | 5/1999 |

* cited by examiner

Primary Examiner—Sandra O'Shea
Assistant Examiner—John Anthony Ward
(74) Attorney, Agent, or Firm—Crowell & Moring LLP

(57) ABSTRACT

A device is provided for controlling the light distribution of a headlamp installation of a motor vehicle, with a first light source for an additional lamp and a second light source for a driving lamp. In order to provide a better device for controlling(the light distribution of a headlamp installation of a vehicle, it is provided that a light source for an additional lamp be mounted so that it can swivel. In this process, the light source for an additional lamp will illuminate part of the vehicle's own lane lying outside the edge of the roadway, while, in its second position, it illuminates the vehicle's own lane, preferably at a greater distance. The light source for the additional lamp is mounted in such a way that it has, at least, one common light passage area with, at least, one other light source.

8 Claims, 4 Drawing Sheets

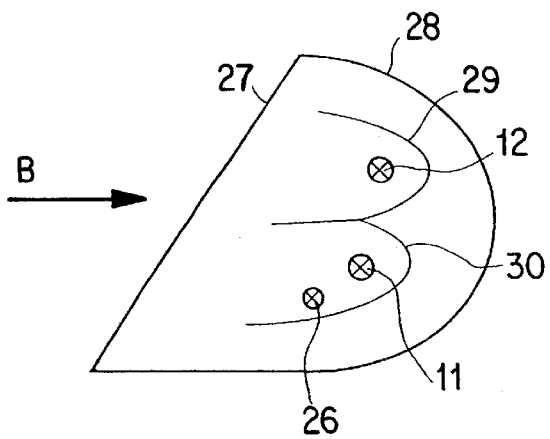
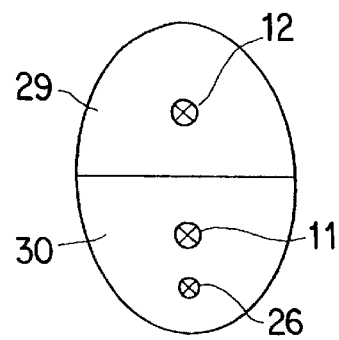
Fig. 5A
Fig. 5B
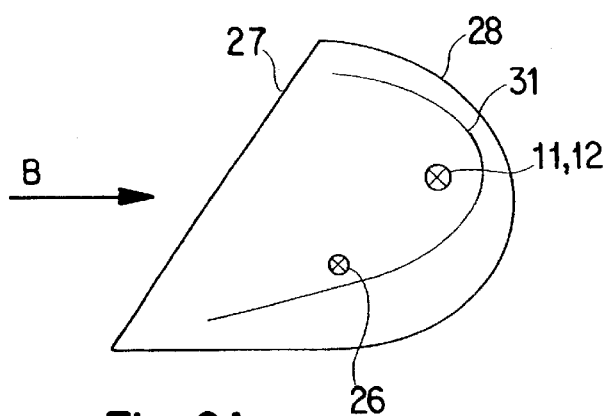
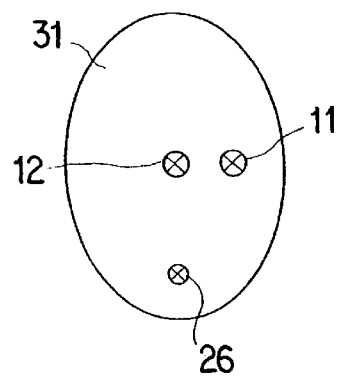
Fig. 6A
Fig. 6B
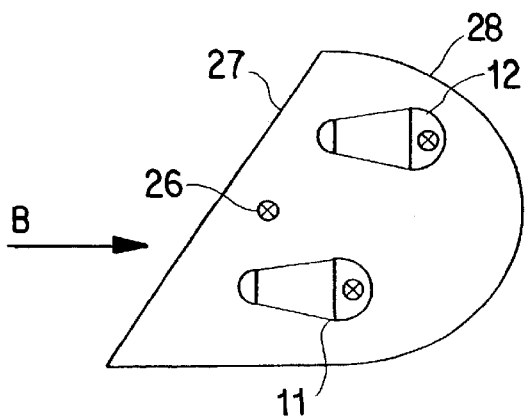
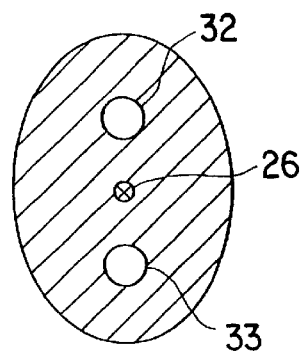
Fig. 7A
Fig. 7B

DEVICE FOR CONTROLLING THE LIGHT DISTRIBUTION OF A HEADLAMP INSTALLATION OF A MOTOR VEHICLE

This application claims the priority of German Patent Document DE 199 50 505.5, filed Oct. 20, 1999, the disclosure of which is expressly incorporated by reference herein.

BACKGROUND AND SUMMARY OF THE INVENTION

The invention relates to a device for controlling the light distribution of a headlamp installation of a motor vehicle which has a first light source for an additional lamp and a second light source for a driving lamp.

In a method of this type for controlling the light distribution pattern of a headlamp installation according to German Patent Document DE 38 44 364 C2, in order to prevent a decrease in visibility of the driver of a vehicle where there is oncoming traffic, the vehicle's own lane is illuminated with an elevated light level. To do this, a light sensor records various areas of the driver's field of vision and the light level to illuminate the vehicle's own lane is increased if a threshold from the light emissions from the area of the oncoming lane is exceeded. However, if the value for the light emissions from the area of the vehicle's own lane or the value for light emissions in an area lying above the lanes drops below a threshold value, the light level is reduced again. To increase the light level, another headlamp is provided in addition to the low beams, which can be switched on additionally in the manner described above. Alternatively, a movable shutter is provided in a headlamp that is already present, with which the light distribution pattern can be changed. Instead of the movable shutter, the light source can also be moved so that the position of the point of highest light intensity is moved.

In contrast to this state of the art, a task of the invention is to produce an improved device for controlling the light distribution pattern of a headlamp arrangement in a motor vehicle.

According to the invention, this task is solved by providing a device for controlling the light distribution of a headlamp installation of a motor vehicle, which has a first light source for an additional lamp, and a second light source for a driving lamp, wherein the first light source is mounted so that it can swivel and, in a first position, illuminates areas lying on edges of a roadway on a vehicle's own lane and, in a second position, illuminates the vehicle's own lane. It is suggested that a light source for an additional lamp be mounted so that it can swivel. In this process, the light source for an additional lamp in a first position will illuminate parts of the vehicle's own lane lying in the area of the edges of the lane, while in its second position it illuminates the vehicle's own lane, preferably at a greater distance. In an advantageous manner, a headlamp arrangement is thus produced in which without a lot of construction effort, in addition to an additional lamp (e.g., to reduce the beam for opposing traffic), at the same time an additional high-beam headlamp (in this case the vehicle's own lane will not be illuminated except at a great distance) or an expressway light (this is a light bundle with a bright-dark boundary that is sharp and basically horizontal which can easily be raised in relation to the low-beam light) can be implemented. In this process, the swiveling capability of the light source can be implemented in that the reflector is swivelled together with the light source or only the light source is swivelled, or only the reflector.

Advantageous further developments of the invention are described below and in the claims. It is suggested that the light source for the additional lamp be arranged in such a way that it has a common light emission area with at least one other light source. Advantageously, because of this measure, when the light source is switched on for an additional lamp, no new illuminated area will be produced that could distract or even irritate the oncoming traffic. For a common light emission area, for example, the light source for an additional lamp can be mounted in the area of the low-beam lamp or combined with a marker light (parking light).

The low-beam lamp and light source for an additional lamp and/or the marker light could be mounted, for example, in a common reflector. It is also contemplated to mount the light source for an additional lamp and the low-beam lamp under a common cover lens and to light up the area found around both light sources with the help of an additional lamp, e.g., the marker light, so that in spite of the separate light generation systems the pattern of a uniform headlamp is maintained.

Finally, it is planned that a control device will be provided to control the light source for an additional lamp, which turns on the light source for the additional lamp and also adjusts its position. On the input side, the control device has a comparator device which is connected with light sensors, e.g., for the area of an oncoming lane and the ambient light and if necessary other sensors, e.g., for vehicle speed. The light sensor basically records the visual field of a driver in driving direction and determines the light emissions for various areas of the field of vision. The comparator device compares the intensity of light emission for each area to a threshold value for each and generates a control signal for the additional lamp from the result of this comparison.

The additional lamp can also be used as a bad weather lamp, so that when there is a reflecting road surface, e.g., because of rain water, the illumination of the vehicle's own lane is increased. A bad weather lamp of this type can be switched on manually using a special switch or automatically using a suitable sensor, e.g., a rain sensor.

Other objects, advantages and novel features of the present invention will become apparent from the following detailed description of the invention when considered in conjunction with the accompanying drawings.

BRIEF DESCRIPTION OF THE DRAWINGS

FIG. 5A is a schematic depiction of an arrangement for headlights constructed according to a preferred embodiment of the invention;

FIG. 5B is a schematic depiction of the headlight of FIG. 5A taken in the direction of arrow B;

FIG. 6A is a schematic depiction of an alternative arrangement of the headlight in FIG. 5A;

FIG. 6B is a schematic depiction of the headlight of FIG. 6A taken in the direction of arrow B;

FIG. 7A is a schematic depiction of an additional alternative arrangement for the headlight of FIG. 5A;

FIG. 7B is a schematic depiction of the headlight of FIG. 7A taken in the direction of arrow B;

DETAILED DESCRIPTION OF THE INVENTION

Figure 1:
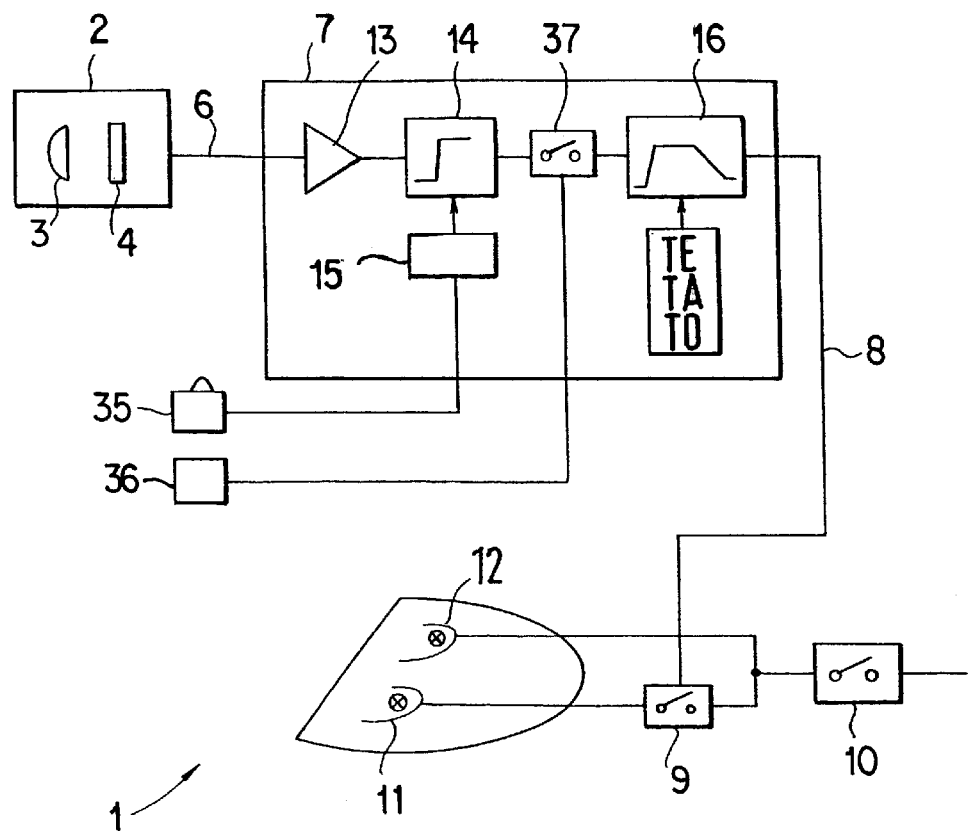
FIG. 1 is a schematic overview representation of a headlight arrangement of a vehicle constructed according to preferred embodiments of the invention.

The headlamp arrangement 1 shown in FIG. 1 of a vehicle, not shown in more detail, comprises a light sensor 2 arranged in the driving direction of the vehicle that records light emissions in the driver's field of vision. The light sensor 2 is made up of imaging optics 3 and a light-sensitive coating 4 mounted in the image plane. By way of signal wire 6, the output signals of light sensor 2 travel to control device 7. An output signal 8 of control device 7 is transmitted to a switching device 9 that acts on a first headlamp 11. In this process, the headlamp 11 is an additional headlamp for illuminating a roadway edge 24 (shown in FIG. 2) while a second headlamp 12 controlled by a light switch 10 is the known low-beam headlamp. The light switch 10 acts on both headlamps 11, 12. Naturally a lifting magnet, etc., can be provided instead of stepper motor 34.

Control device 7 can have, on its input side, an amplifier 13 for preparing the signal arriving on signal wire 6. Connected after that there is a comparator device 14 that compares the output signal from amplifier 13 to a signal supplied by a threshold sensor 15. Threshold sensor 15 is connected in this process to a sensor 35 for ambient brightness, which supplies signal U. Sensor 35 is pointed upward here. An on-going mean value formation already occurs within sensor 35 in order to compensate short-term influences as are caused e.g., by street lights. The threshold sensor adjusts the threshold value supplied to the comparator device to the ambient brightness U in such a way that this threshold value also increases with increasing ambient brightness. An ON and OFF delay device 16 that is connected after the comparator device 14 with preset delay times TE for the ON delay, TA for the OFF delay and TO for a dead time that precedes the OFF delay finally generates the output signal 8 that can be continuously adjusted (dimmed).

Forwarding the output signal 8 to the switching device 9 is controlled in this process by a switch 37 that is connected to a sensor 36 for vehicle speed. In this example, output signal 8 will only be forwarded if the vehicle speed v recorded by sensor 36 lies within a range between 30 km/h and 120 km/h. It is also possible to activate the entire control device 7 only within the range of this vehicle speed v. In addition, it can be ensured that a shutoff of control device 7 or transfer of the output signals 8 can only occur if output signal 8 has the value 0. This means additional headlamp 11 can not be shut off when in operation if the vehicle leaves the vehicle speed range; rather switching on the additional headlamp 11 is suppressed only when the vehicle speed range has been left.

Figure 2:
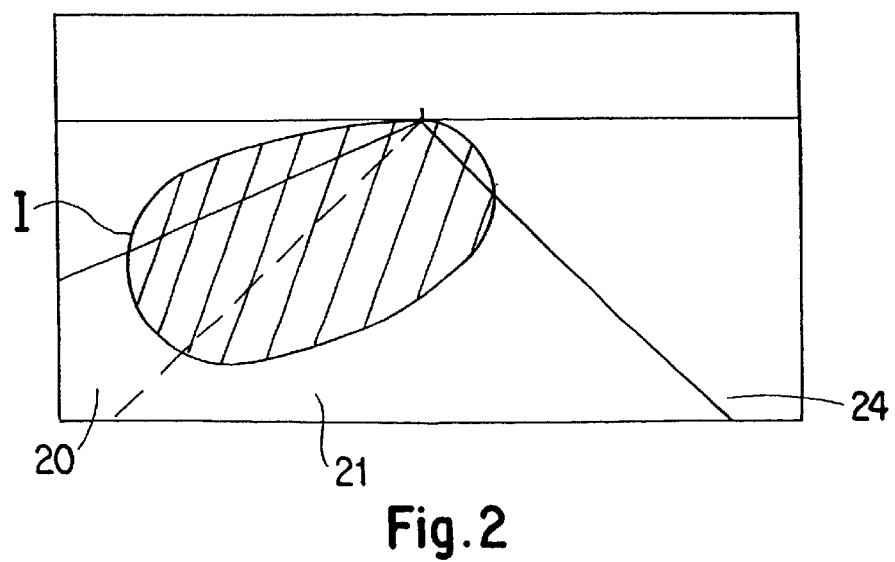
FIG. 2 is a schematic representation of a field of vision of a driver of a vehicle.

FIG. 2 shows the field of vision of the driver covered by the light-sensitive field 4. The area I to the left of the dashed lines represents the area of an opposing lane 20. Area I is selected so it is large enough that oncoming vehicles can be recorded. It has been shown that in this process a section of the vehicle's own lane should also be recorded to be able to recognize oncoming vehicles even on curved roads.

Figure 3:
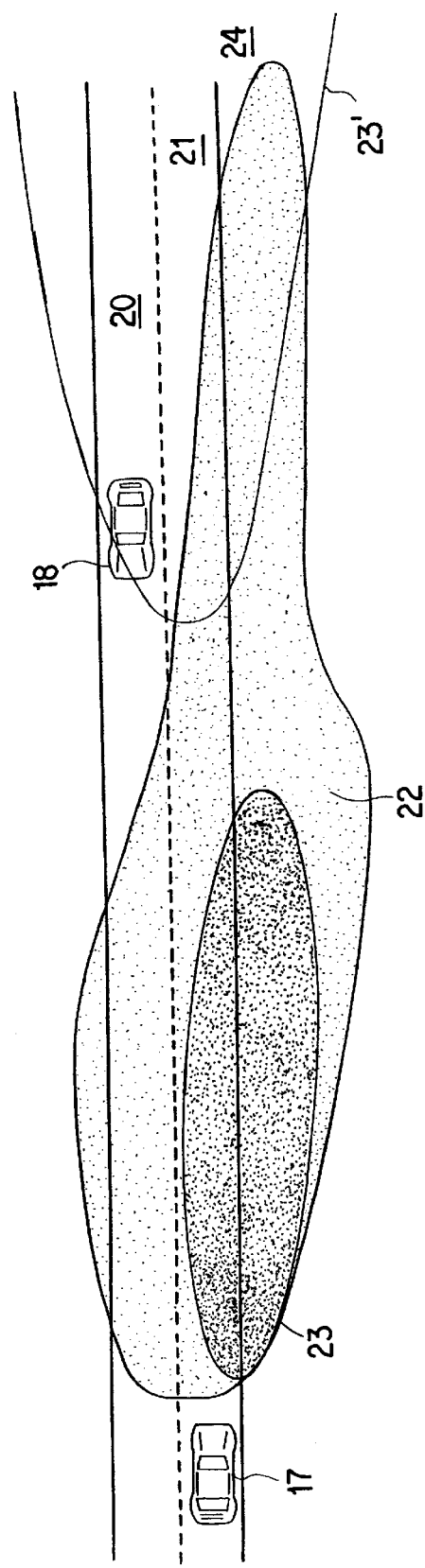
FIG. 3 is a schematic representation from a bird's-eye view of a light distribution for vehicles on a highway.

FIG. 3 shows the light distribution pattern of headlamps 11, 12 from a bird's-eye view. Vehicle 17 is located on its own directional lane 21, another vehicle 18 is on the opposing lane 20. The low-beam headlamp 12 of the driver's own vehicle 17 generates light cone 22, while additional headlamp 11 generates light cone 23 in its initial position. Because of stepper motor 34, additional headlamp 11 can be swivelled into a second position 23, in which it can be used as an additional high-beam headlamp, as a range support for the low-beam lamp (e.g., when driving on the expressway) or a light-signaling device (light horn) (preferably, e.g., in connection with a discharge lamp to generate low beam and high beam as the first headlamp 11).

Control device 7 continuously compares the signal supplied by the light sensitive field for area I to a threshold value stored for area I in a threshold sensor 15, which is continuously adjusted to the ambient brightness with the use of signal U. If the comparator device 14 recognizes that in area I, i.e., in the area of the opposing lane 20, the light intensity exceeds the limit value specified by the threshold sensor 15, the control device 7 sends an output signal 8 that causes the first switching device 9 to switch on additional headlamp 11. Because of this measure, the light cone 22 is supplemented with light cone 23, and one lane edge area 24 (see FIG. 2) is more brightly illuminated.

Because of the clearly higher illumination-in the areas covered by light cone 23-the driver's vision is automatically drawn from the opposing lane 20 to the lane edge 24 that is now more brightly illuminated. This means that blinding caused by an oncoming vehicle 18 in the opposing lane 20 can be reduced without increasing blinding of the oncoming vehicle 18. To do this, light cone 23 is aligned in such a way that no scattered light goes in the direction of the opposing lane 20.

Figure 4:
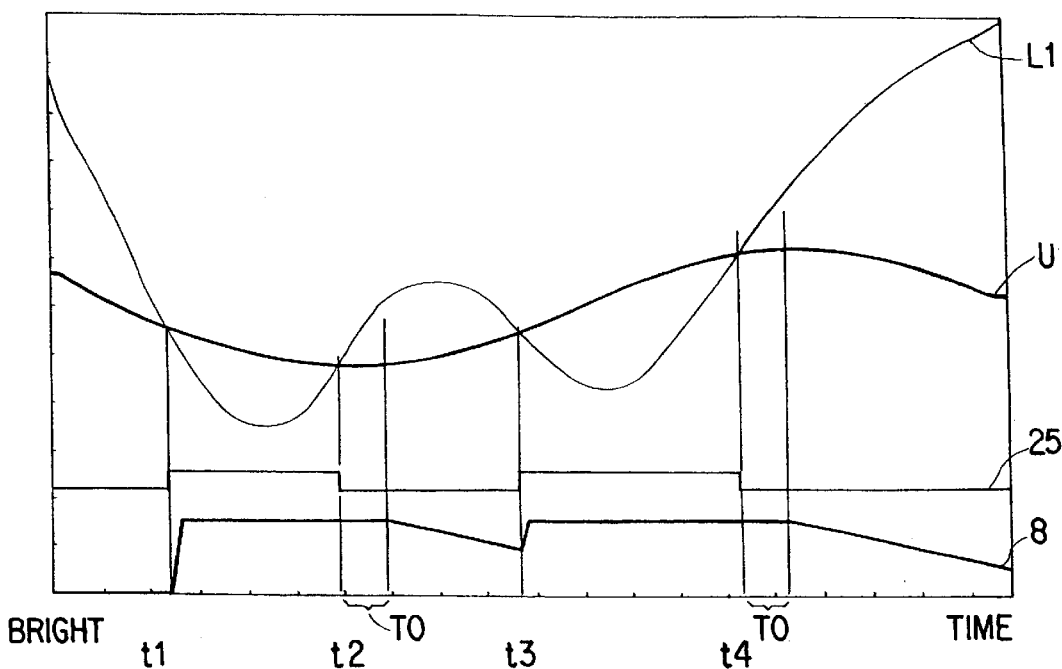
FIG. 4 is a time curve of an output signal generated by a turn-on and turn-off delay for a second headlight of an arrangement constructed according to preferred embodiments of the invention.

FIG. 4 shows the time curve of output signal 8, signal U for the ambient brightness and signal L1 for the brightness in area I. Between points in time t1 and t2, as well as t3 and t4, there is an oncoming vehicle 18 in the opposing lane 20, which can be recognized from the signal levels of signal L1. At the first point in time t1, a first oncoming vehicle 18 is so close to the driver's own vehicle 17 that there is a danger of blinding. At this point in time, the comparator 14 outputs a signal 25 to the ON and OFF delay device 16. Because of the ON and OFF device 16, the output signal 8 does not immediately reach the value 100%, but only after a preset delay time TE of 0.2 sec. At point of time t2, the oncoming vehicle 18 passes the driver's own vehicle 17, so that there is no longer any danger of blinding. At this point in time, signal 25 is, therefore, discontinued. In contrast, output signal 8 does not drop immediately to 0%; rather, it is first maintained for a dead time TO of 2 sec that is present in the ON and OFF delay device 16 and, then, slowly decreased over a delay time TA that is also preset, in this case for 3 sec.

At the third point in time t3, a second vehicle has approached close enough so that, again, a danger of blinding exists. At this point in time t3, the output signal 8 (and, thus, also the light current of the additional headlamp 11) has dropped to 70% and is now increased to 100% over the delay time TE preset for the ON delay. At the fourth point in time t4, the second vehicle passes the driver's own vehicle 17. Since, in this example, no other vehicle is approaching, the output signal 18 now drops to 0% within the preset delay time TA, after expiration of the dead time TO, i.e., the additional headlamp 11 is switched off completely.

The threshold value supplied from the threshold sensor 15 to the comparator 14 depends here on the (average) ambient brightness U determined by sensor 35. The threshold value increases with increasing ambient brightness, so that, in the result, the brightness determined for monitored area I must always lie above the ambient brightness by a specific amount or percentage in order to trigger switching on of the additional headlamp 11.

Possible illustrations of headlamps 11, 12 are shown in FIGS. 5A, 5B; 6A, 6B; and 7A, 7B.

The headlamps 11, 12 can effectively be mounted in a common housing 28 under a common cover lens 27. In addition to the headlamps 11, 12, a marker light 26 is provided.

In the first embodiment according to FIGS. 5A and 5B, the plan is for the second headlamp 12 to have its own reflector 29, while another reflector 30 is used both by additional headlamp 11 and by marker light 26.

In contrast, in the second embodiment according to FIGS. 6A and 6B, both headlamps 11, 12 are mounted in a common reflector 31. The additional headlamp 11 (more specifically, the light source for additional headlamp 11) is mounted offset with respect to the light source for the low-beam headlamp 12 in order to generate the desired light beam 23. The marker light 26 can also be mounted in its own reflector 31.

In the third embodiment according to FIGS. 7A and 7B, the headlamps 11, 12 are designed as separate projection headlamps. These generate separate light passage areas 32, 33 on the common cover lens 27. The marker light 26 is, hereby, arranged between the headlamps 11 and 12, or at another suitable location inside housing 28, so that light escaping from the marker light 26 illuminates the area lying outside the light passage areas 32, 33, the area represented in dotted lines of the common cover lens 27. Alternatively, scattered light from the low-beam headlamp 12 can also be used for illumination; in this case, the marker light 26 can be mounted at another location.

In the embodiments according to FIGS. 5A, 5B; 6A, 6B and 7A, 7B, it is important that the additional headlamp 11 is always mounted in combination with another headlamp, in this case, the low-beam headlamp 12 or the marker light 26, in such a way that common light passage areas result. So, in the embodiment according to FIGS. 5A and 5B, the additional headlamp 11 and the marker light 26 have a common light passage area, in the second embodiment according to FIGS. 6A and 6B, the additional headlamp 11 and the low-beam headlamp 12, and in the third embodiment according to FIGS. 7A and 7B, the additional headlamp 11 (and/or its light passage area 33) and the marker light 26.

Figure 8:
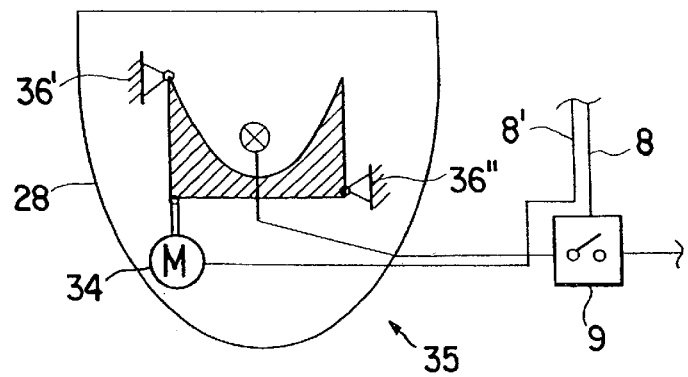
FIG. 8 is a schematic representation of a device for pivoting the headlight of an arrangement constructed according to preferred embodiments of the invention.

FIG. 8 shows a diagram of a device 35 for swiveling the additional headlamp 11. As already shown in FIG. 1, the additional headlamp 11 is triggered using illumination technology via the switch device 9 and output 8 of control unit 7 (not shown here), while the stepper motor 34 is connected to one output 8' of control unit 7. Additional headlamp 11 is mounted so that it can swivel in the headlamp housing 28 with the help of two arms 36' and 36" and can be swivelled by the stepper motor 34 that is connected to the additional headlamp 11. The swivel range is only a few degrees. In the initial position shown, the additional headlamp 11 generates light cone 23 (see FIG. 3), while in its second position, into which it is swiveled by stepper motor 34, it generates light cone 23'.

Figure 9:
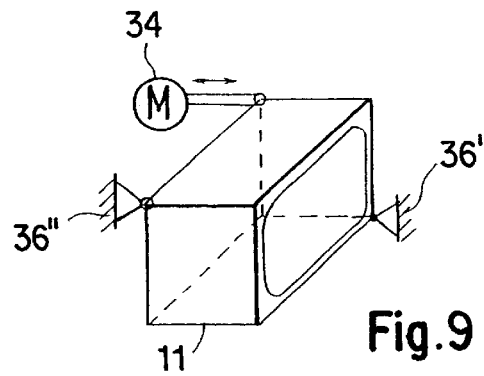
FIG. 9 is a detail representation of hinges according to FIG. 8.

FIG. 9 shows a schematic diagram of the arrangement of arms 36' and 36", that is designed so that a diagonal swivel axis results whose position is arranged in such a way that additional headlamp 11 can be swivelled between its initial position and its second position. The intervention point of stepper motor 34 must only be selected here so that a force application axis of stepper motor 34 does not intersect the swivel axis.

Control device 7 will then trigger stepper motor 34 (and thus swivel additional headlamp 11 into its second position), if for example the driver operates the light horn or if the high beam is switched on. If control unit 7 recognizes expressway driving with appropriate layout of the illumination (i.e., a hard light-dark boundary in connection with an inclination of approximately 0.2%), the additional headlamp 11 can also be switched on as a long-range support for the low beams. Illumination of the lane edge area 24 is selected as the initial position, so that, in the case of failure of stepper motor 34, oncoming vehicles 18 can not be blinded by additional headlamp 11 located in the second position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle headlamp assembly for a vehicle which in use travels in a first roadway lane of a roadway in a first travel direction which is opposite to a second vehicle travel direction for vehicles traveling in a second roadway lane of the roadway, said vehicle headlamp assembly comprising:
    a common headlamp cover lens,
    a first roadway illuminating light source arranged behind the cover lens and operable to project light through a first light passage area of the cover lens onto the roadway, and
    a second roadway illuminating light source arranged behind the cover lens and operable to project light through a second light passage area of the cover lens onto the roadway,
    wherein the first illuminating light source is pivotally movable between a first position illuminating edge areas of the first roadway lane disposed furthest from the second roadway lane and a second position illuminating the first roadway lane.

2. A vehicle headlamp assembly according to claim 1, wherein the second roadway illuminating light source is operable as a high beam light.

3. A vehicle headlamp assembly according to claim 1, comprising a marker light arranged behind the cover lens.

4. A vehicle headlamp assembly according to claim 3, wherein the marker light is combined with the first illuminating light source.

5. A vehicle headlamp assembly according to claim 1, comprising a common reflector for the first and second illuminating light sources.

6. A vehicle headlamp assembly according to claim 4, comprising a common reflector for the marker light and the first and second illuminating light sources.

7. A vehicle headlamp assembly according to claim 1, comprising at least one light sensor operable to detect light emission from the second lane to thereby facilitate control of pivoting movement of the first illuminating light source.

8. A vehicle headlamp assembly according to claim 1, comprising:
    at least one light sensor operable to sense light emissions acting on a vehicle driver in the first roadway lane from an area of the second roadway lane, a comparator operable to compare the intensity of light sensed by the at least one sensor with a predetermined threshold value, and a control device operable to pivot the first illuminating light source toward the first position in response to said comparator determining light intensity above the threshold value and to pivot the first illuminating light source to said second position in response to said comparator determining light intensity below the threshold value.

* * * * *